(12) United States Patent
Seo et al.

(10) Patent No.: US 9,189,970 B2
(45) Date of Patent: Nov. 17, 2015

(54) MINIATURE OF WASHING MACHINE FOR EXHIBITION

(75) Inventors: Inhyouk Seo, Gyeongnam (KR); Hyejeong Kim, Gyeongnam (KR)

(73) Assignee: LG Electronics Inc., Seoul (KR)

( * ) Notice: Subject to any disclaimer, the term of this patent is extended or adjusted under 35 U.S.C. 154(b) by 163 days.

(21) Appl. No.: 13/877,948

(22) PCT Filed: Oct. 12, 2011

(86) PCT No.: PCT/KR2011/007574
§ 371 (c)(1),
(2), (4) Date: Apr. 5, 2013

(87) PCT Pub. No.: WO2012/050356
PCT Pub. Date: Apr. 19, 2012

(65) Prior Publication Data
US 2013/0203040 A1    Aug. 8, 2013

(30) Foreign Application Priority Data

Oct. 14, 2010   (KR) ........................ 10-2010-0100528

(51) Int. Cl.
*G09B 19/00*     (2006.01)
*D06F 35/00*     (2006.01)

(52) U.S. Cl.
CPC ................ *G09B 19/00* (2013.01); *D06F 35/00* (2013.01)

(58) Field of Classification Search
CPC ......... D06F 35/006; A47F 7/30; G09B 25/02; G09B 25/00; A47G 21/02
USPC .............................. 434/365, 382, 389; 68/147
See application file for complete search history.

(56) References Cited

U.S. PATENT DOCUMENTS

| | | | | |
|---|---|---|---|---|
| 3,594,922 A | * | 7/1971 | Ellis | ................................ 434/72 |
| 3,698,370 A | * | 10/1972 | Haldeman et al. | .......... 123/193.4 |
| 3,763,670 A | * | 10/1973 | Harrold | ........................ 68/12.06 |
| 4,073,069 A | * | 2/1978 | Basmajian | .................... 434/389 |
| RE30,253 E | * | 4/1980 | Haldeman et al. | .......... 123/193.4 |
| 4,341,034 A | * | 7/1982 | Tsui et al. | ..................... 446/474 |

(Continued)

FOREIGN PATENT DOCUMENTS

CN        2335211 Y      8/1999
CN        2335211 Y * 8/1999 ............ G09B 25/02

(Continued)

OTHER PUBLICATIONS

PCT International Search Report dated May 3, 2012 for Application No. PCT/KR2011/007574, 3 pages.

(Continued)

*Primary Examiner* — Sam Yao
*Assistant Examiner* — Michael Humphrey
(74) *Attorney, Agent, or Firm* — Fish & Richardson P.C.

(57) ABSTRACT

A miniature of a washing machine for exhibition includes: a casing having an opening at an upper portion thereof; a door for opening and closing the opening; a tub fixedly installed within the casing; a drum rotatably installed within the tub; a driving motor installed at an outer side of the tub; an electric motor unit transferring rotary force of the driving motor to the drum; a tub cover installed at an upper portion of the tub and including a guide unit for guiding water, which is discharged upwardly along an inner wall surface of the tub, to the inner side of the tub when the drum is rotated; and a light emitting unit irradiating light to the interior of the tub.

17 Claims, 5 Drawing Sheets

(56) References Cited

U.S. PATENT DOCUMENTS

| | | | | |
|---|---|---|---|---|
| 4,483,278 | A | * | 11/1984 | Kolacz .................. 123/41.33 |
| 5,575,660 | A | * | 11/1996 | Hooks ..................... 434/374 |
| 5,726,402 | A | * | 3/1998 | Katz et al. ................ 200/61.7 |
| 6,351,974 | B1 | | 3/2002 | Lyu et al. |
| 6,668,410 | B2 | | 12/2003 | Ryu et al. |
| 6,758,679 | B2 | * | 7/2004 | Miyamura et al. ........... 434/379 |
| 7,263,862 | B2 | | 9/2007 | Lyu et al. |
| 7,263,864 | B2 | | 9/2007 | Lyu et al. |
| 8,826,701 | B2 | * | 9/2014 | Hong et al. ................... 68/24 |
| 2002/0069466 | A1 | | 6/2002 | Lyu et al. |
| 2004/0000014 | A1 | | 1/2004 | Lyu et al. |
| 2004/0168482 | A1 | | 9/2004 | Lyu et al. |
| 2008/0109243 | A1 | * | 5/2008 | Ebrom et al. ................... 705/1 |
| 2008/0109312 | A1 | * | 5/2008 | Ebrom et al. .................. 705/14 |
| 2010/0154132 | A1 | * | 6/2010 | Im et al. ......................... 8/159 |
| 2014/0076003 | A1 | * | 3/2014 | Atsushi et al. ................ 68/131 |

FOREIGN PATENT DOCUMENTS

| | | | |
|---|---|---|---|
| CN | 1512002 | A | 7/2004 |
| CN | 101701403 | A | 5/2010 |
| JP | 2004164397 | A | 6/2004 |
| KR | 1020000015280 | * | 8/1998 |
| KR | 1998-0064041 | U | 11/1998 |
| KR | 2000-0015280 | A | 3/2000 |
| KR | 2003-0045445 | A | 6/2003 |
| KR | 2006-0099831 | A | 9/2006 |
| KR | 630892 | B1 | 10/2006 |

OTHER PUBLICATIONS

Office Action dated Dec. 11, 2014 issued in corresponding Chinese Patent Application No. 201180049538.6, including English translation, 16 pages.

* cited by examiner

MINIATURE OF WASHING MACHINE FOR EXHIBITION

CROSS REFERENCE TO RELATED APPLICATIONS

This application is a U.S. National Phase Application under 35 U.S.C. §371 of International Application PCT/KR2011/007574, filed on Oct. 12, 2011, which claims the benefit of Korean Application No. 10-2010-0100528, filed on Oct. 14, 2010, the entire contents of which are hereby incorporated by reference in their entireties.

TECHNICAL FIELD

The present invention relates to a miniature of washing machine for exhibition and, more particularly, to a miniature of washing machine for exhibition offered to help consumers understand operational principles of washing machines.

BACKGROUND ART

Various types of washing machines exist according to their operational schemes, and the difference in operational scheme is a key factor for determining the performance and purpose of washing machines Thus, if he or she understands how a washing machine operates in purchasing a washing machine, it would be much helpful for consumers to select a washing machine having his desired purpose and performance. This is also very important for the seller side in that consumer's claims or request for refunding because of a misunderstanding about the performance of washing machines can be reduced.

However, the operational schemes of washing machines may be discernible by the external appearance but may not in some cases. In particular, the operational schemes and features of washing machines may be confirmed by actually driving them, but it is actually impossible to drive washing machines in a shop having a limited area in which a variety of selections of washing, machines are exhibited. Thus, the reality is that consumers indirectly infers the features of washing machines through the features described in catalogues or customers' evaluation posted on the Internet notice boards or the like.

Thus, one of the methods for resolving such a problem is using a miniature having the features of a corresponding product. A miniature of a life-size product occupies a considerably small space compared with the life-size product may only need to show the operation schemes without having to exhibit the performance of the life-size products. Thus, it can effectively make consumers understand the characteristics of the corresponding product at a low cost.

In this respect, however, in the process of miniaturizing the life-size product, the function of the corresponding product may not be implemented or an excessive amount of cost may be incurred. In particular, in case of a washing machine having a function of improving washing performance by jetting washing water downwardly during a washing process, complicated constituent components such as a pump, a valve, or the like, must be expressed to implement the washing water jetting unit, but in actuality, it is impossible to install such components within the miniature.

DISCLOSURE

Technical Problem

In this respect, however, in the process of miniaturizing the life-size product, the function of the corresponding product may not be implemented or an excessive amount of cost may be incurred. In particular, in case of a washing machine having a function of improving washing performance by jetting washing water downwardly during a washing process, complicated constituent components such as a pump, a valve, or the like, must be expressed to implement the washing water jetting unit, but in actuality, it is impossible to install such components within the miniature.

An aspect of the present invention provides a miniature of a washing machine for exhibition capable of easily implementing a flow of water jetted downwardly (i.e., from an upper side to a lower side) in a washing tub.

Technical Solution

According to an aspect of the present invention, there is provided a miniature of a washing machine for exhibition, including: a casing having an opening at an upper portion thereof; a door for opening and closing the opening; a tub fixedly installed within the casing; a drum rotatably installed within the tub; a driving motor installed at an outer side of the tub; an electric motor unit transferring rotary force of the driving motor to the drum; a tub cover installed at an upper portion of the tub and including a guide unit for guiding water, which is discharged upwardly along an inner wall surface of the tub, to the inner side of the tub when the drum is rotated; and a light emitting unit irradiating light to the interior of the tub.

In implementing a flow of water jetted to the interior of the drum from an upper side of the tub, an effect that water is jetted to the interior of the tub by using centrifugal force applied to water accommodated in the interior of the tub according to the rotation of the drum can be obtained without using a pump or a valve. Namely, when the drum is rotated, water supplied to the interior of the tub is rotated and centrifugal force is applied to the water. When the centrifugal force is gradually increased, water is moved to an upper side of the tub along the inner wall of the tub so as to be introduced into the tub cover, and then, supplied to the interior of the tub again by the tub cover.

Thus, without a pumping unit, water may be supplied into the tub, and the effect that water is jetted from the upper portion of the tub can be obtained by appropriately determining the rotation speed of the drum.

Here, the tub cover may have an annular shape having a section in a semi-circular shape. Here, a plurality of guide vanes having a spiral form may be formed at an inner side of the tub cover to allow discharged water to be discharged in a spiral form.

A limit switch for detecting whether or not the door is open or closed may be installed at an upper portion of the casing, and when the door is open, the rotation of the drum may be stopped. A certain switch may be used as the limit switch. For example, a switch which is pressed by a portion of the door when the door is closed may be employed. Accordingly, the drum can be rotated only when the door is closed, thereby preventing water within the drum from splashing to the outside.

Besides, a tilt sensor may be installed to be protruded from a lower surface of the casing. When the casing is inclined at more than a certain angle or separated by more than a certain distance from the ground, the tilt sensor may be protruded to stop the rotation of the drum. Accordingly, the washing machine miniature can be operated only when stably supported.

Meanwhile, the tub cover may be made of a transparent material, and a light emitting unit may be installed at an upper portion of the tub cover. Accordingly, the tub cover may serve as a light guide unit dispersing light generated by the light emitting unit.

Here, a second tub cover covering the light emitting unit may be additionally provided.

The electric motor unit may include: a follower pulley fixed at a lower side of the drum; a driving pulley fixed to a rotational shaft of the driving motor; and a belt fastened between the follower pulley and the driving pulley.

According to embodiments of the present invention, the flow of water jetted into the drum from the upper side of the tub can be easily implemented without using components such as a pump, a value, or the like.

The foregoing and other objects, features, aspects and advantages of the present invention will become more apparent from the following detailed description of the present invention when taken in conjunction with the accompanying drawings.

MODE FOR INVENTION

A miniature of a washing machine according to an embodiment of the present invention will now be described in detail with reference to the accompanying drawings.

Figure 1:
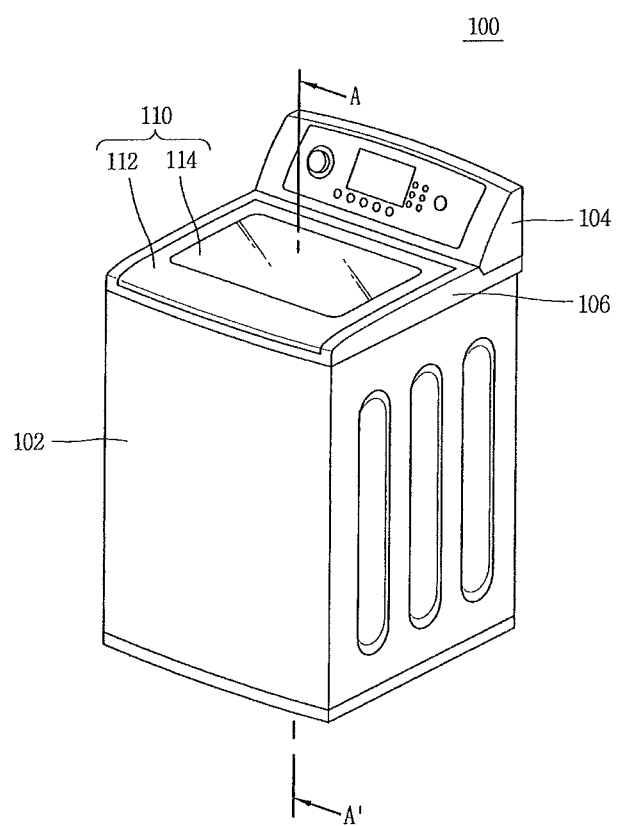
FIG. 1 is a perspective view showing an external appearance of a miniature of a washing machine (or a washing machine miniature) according to an embodiment of the present invention.
Figure 2:
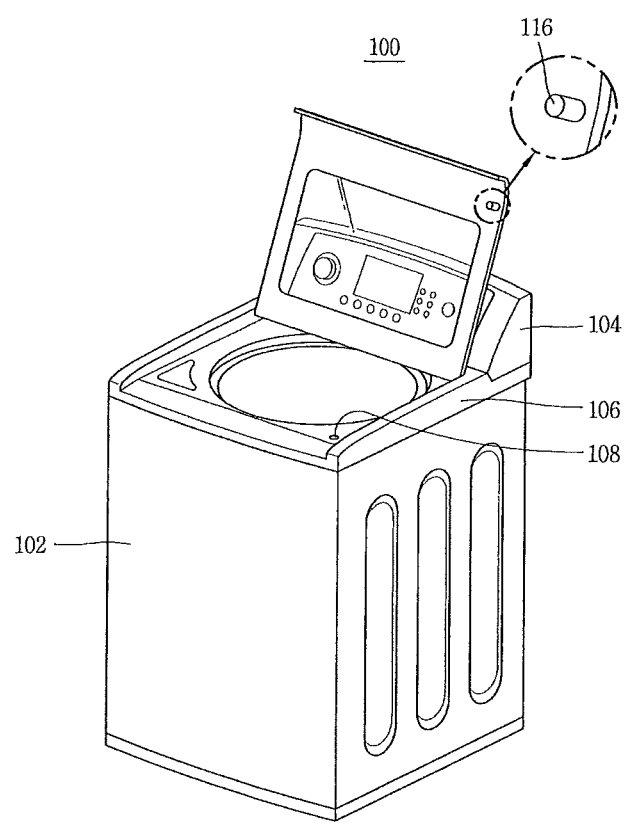
FIG. 2 is a perspective view showing a state in which a door is open in the washing machine miniature illustrated in FIG. 1.

FIG. 1 is a perspective view showing an external appearance of a miniature of a washing machine (or a washing machine miniature) according to an embodiment of the present invention, and FIG. 2 is a perspective view showing a state in which a door is open in the washing machine miniature illustrated in FIG. 1.

With reference to FIGS. 1 and 2, a miniature 100 of a washing machine (or a washing machine miniature 100) according to an embodiment of the present invention has a shape of rectangular parallelepiped as a whole, and has a similar form as that of a general top-load type washing machine. In detail, the washing machine miniature 100 includes a box-like shaped casing 102, and a top cover 106 covers an upper portion of the casing 102. A control panel unit 104 having a form obtained by reducing a control panel of an actual washing machine is formed on a rear upper portion of the top cover 106, increasing the realistic sense. In addition, a printed circuit board (PCB) (to be described) on which a controller of a driving motor is mounted is installed within the control panel unit 104.

An opening is formed at the upper portion of the top cover 106, and the opening is opened and closed by a door 110. The door 110 includes a door frame 112 having one end hinge-coupled to the top cover 106 and a transparent panel unit 114 having an outer circumferential portion surrounded by the door frame 112. The interior of the casing 102 can be checked through the transparent panel unit 114 without having to open the door 110.

With reference to FIG. 2, a switch hole 108 is formed on a front upper portion of the top cover 108, and a projection 116 is formed on a portion, of a rear surface of the door 110, which faces the switch hole 108. Thus, when the door 110 is closed, the projection 116 is inserted into the switch hole 108 to press a limit switch (not shown) installed within the switch hole 108, to allow the controller to check an opening or closing state of the door 110. Information regarding the opening and closing of the door 110 is transferred to the controller (not shown), so that when the door 110 is open while a drum (to be described) is being rotated, the operation of the drum can be stopped.

Figure 3:
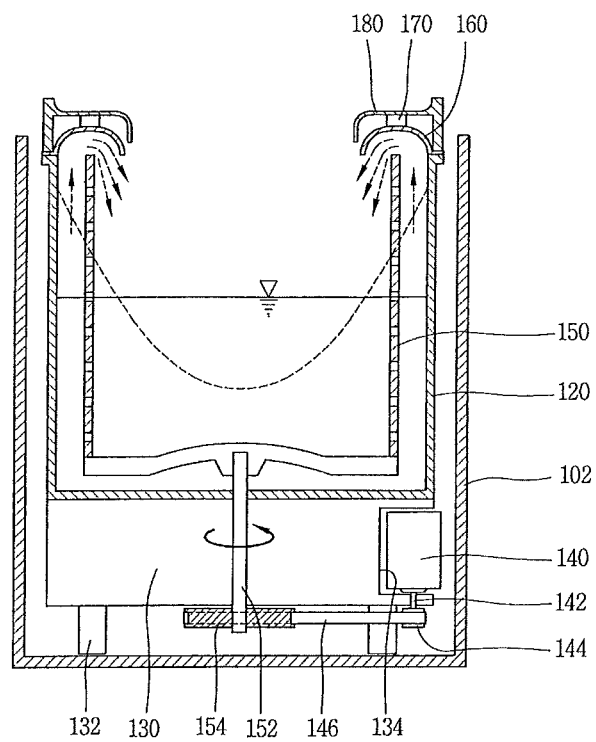
FIG. 3 is a sectional view taken along line A-A' in FIG. 1.

FIG. 3 is a sectional view showing an internal structure of the washing machine miniature 100. With reference to FIG. 3, a cylindrical tub 120 is fixedly installed within the casing 102, and a driving unit installation region 130 is connected to a lower surface of the tub 120. Legs 132 are installed on a lower portion of the driving unit installation region 130, whereby the driving unit installation region 130 and the tub 120 are supported by the bottom surface of the casing 102.

A space 134 is formed at one side of the driving unit installation region 130, and a driving motor 140 is installed in the space 134 such that a rotational shaft 142 of the driving motor 140 faces downwardly. A driving pulley 144 is installed at an end portion of the rotational shaft 142. The driving pulley 144 is connected with a follower pulley 154 (to be described) by a belt 146.

Meanwhile, the tub 120 is formed to accommodate water therein. A drum 150 is rotatably installed within the tub 120. A plurality of through holes are formed on the drum 150 to allow water supplied to the interior of the tub 120 to be introduced into the drum 150. A rotational shaft 152 is installed at a lower portion of the drum 150, and the follower pulley 154 is fixed to an end portion of the rotational shaft 152. A shape similar to a pulsator of a general washing machine is formed on the bottom surface of the drum 150 in order to accelerate rotation of water supplied to the interior of the tub 120 when the drum 150 is rotated.

The drum 150 is formed to have an inner diameter smaller than that of the tub 120, so there is a certain gap between the drum 150 and the tub 120. In order to cover the gap, a tub cover 160 is installed on the tub 120.

Figure 4:
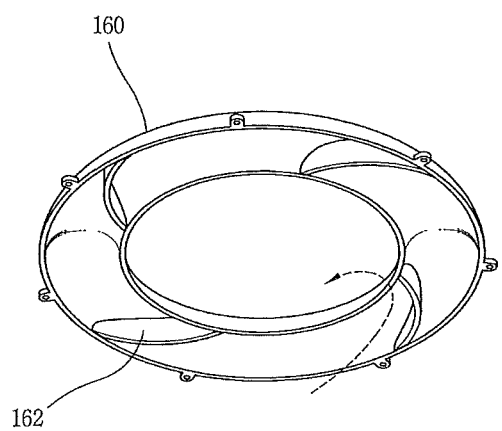
FIG. 4 is a perspective view showing a tub cover in FIG. 1.

As shown in FIG. 4, the tub cover 160 has an annular shape to surround an upper end portion of the tub 120 and has a section in a semi-circular shape. The inner diameter of the tub cover 160 is smaller than that of the drum 150, so a central end portion of the tub cover 160 is positioned at the inner side of the drum 150. The tub cover 160 is made of a transparent material, and a light emitting device 170 in which a plurality of LEDs are disposed in a circumferential manner is installed at an upper side of the tub cover 160.

A second tub cover 180 is installed at an upper portion of the light emitting device 170. Unlike the tub cover 160, the second tub cover 180 is made of an opaque material to block or prevent light irradiated from the light emitting device 170 from being directly transferred to consumers. In addition, the second tub cover 180 also serves to make the light emitting device 170 stably supported at the upper portion of the tub cover 160. Also, the second tub cover 180 fills a gap between the upper portion of the tub 120 and the top cover 106 to prevent water introduced into the interior of the tub 120 from flowing to the interior of the casing 102. To this end, an O-ring (not shown) may be installed on a lower surface of the top cover 106 and compressed with the second tub cover 180.

As shown in FIG. 4, a total of four guide vanes 162 are formed at an inner side of the tub cover 160. The guide vanes 162 demarcates the interior of the tub cover 160 into four spaces, and each of the guide vanes 162 has a spiral shape.

The operation of the washing machine miniature 100 according to an embodiment of the present invention will now be described with reference to FIGS. 3 and 4. In FIG. 3, a solid line indicated by the arrow denotes a water level of water filled in the tub 120.

In a state in which the drum 150 is stationary, as illustrated, a planar water level is maintained, but when the drum 150 is rotated, water filled in the tub swirls. When the water swirls, water is pushed to an outer side in a radius direction due to the operation of centrifugal force, but here, since the movement of water is hampered by an inner wall of the tub 120, water is lifted along the tub 120.

When the rotation speed of the drum 150 is increased, water adjacent to the inner wall of the tub 120 is discharged to an upper side of the tub 120 as indicated by the dotted line and then introduced into the tub cover 160. Here, since water is rotated in the same direction as the rotation direction of the drum 150, in actuality, the water is introduced in the direction of dotted lines into the interior of the tub cover 160.

The thusly introduced water flows along the internal space of the tub cover 160, and then, discharged toward the center of the tub cover 160 along the surface of the guide vanes 162. Thus, the effect that water is jetted from four points can be obtained without having to install a pump, a nozzle, or the like.

Meanwhile, while the drum 150 is being rotated, the light emitting device 170 is also operated. As mentioned above, since the tub cover 160 is made of a transparent material, light irradiated from the light emitting device 170 is diffused along the tub cover 160, evenly illuminating the internal space of the drum 150.

Here, the tub cover 160 may not necessarily have the semi-circular shaped section. Namely, it may have a certain shape, e.g., a sloped shape toward the central axis of the drum 150, to allow the discharged water to be introduced again to the drum 150.

Figure 5:
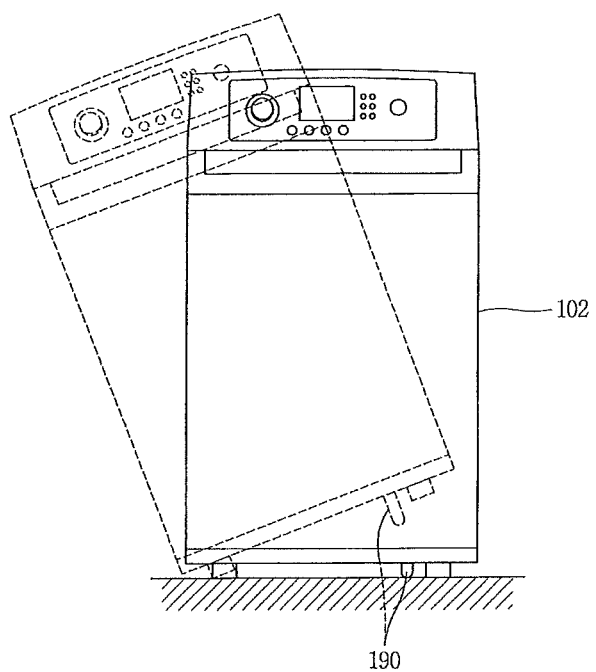
FIG. 5 is a perspective view showing a portion of a tilt sensor of the washing machine miniature illustrated in FIG. 1.

As described above, when the door 110 is open while the drum 150 is being rotated, the foregoing limit switch detects it and the rotation of the driving motor 140 is stopped. Besides, if the drum 150 is rotated in a state in which the casing 102 is inclined at more than an certain angle or the casing 102 is separated from the ground, the water within the drum is likely to flow out, so a tilt sensor 190 for sensing whether or not the washing machine miniature 100 falls down may be provided on a lower surface of the casing 102 as shown in FIG. 5.

Namely, the tilt sensor 190 may be installed on the lower surface of the casing 102 by using a coil spring or an elastic unit such that it is provided from the lower surface of the casing 102. Accordingly, if the distance between the lower surface of the casing 102 and the ground is increased, the tilt sensor 190 is outwardly protruded according to the elastic force of the elastic unit, and when the tilt sensor 190 is protruded to be more than an certain level, contacts of the switch installed in the casing 102 are separated to stop the driving of the driving motor 140. In this manner, when the casing 102 is inclined at more than a certain angle or becomes away from the ground, the rotation of the drum 150 can be stopped.

Figure 6:
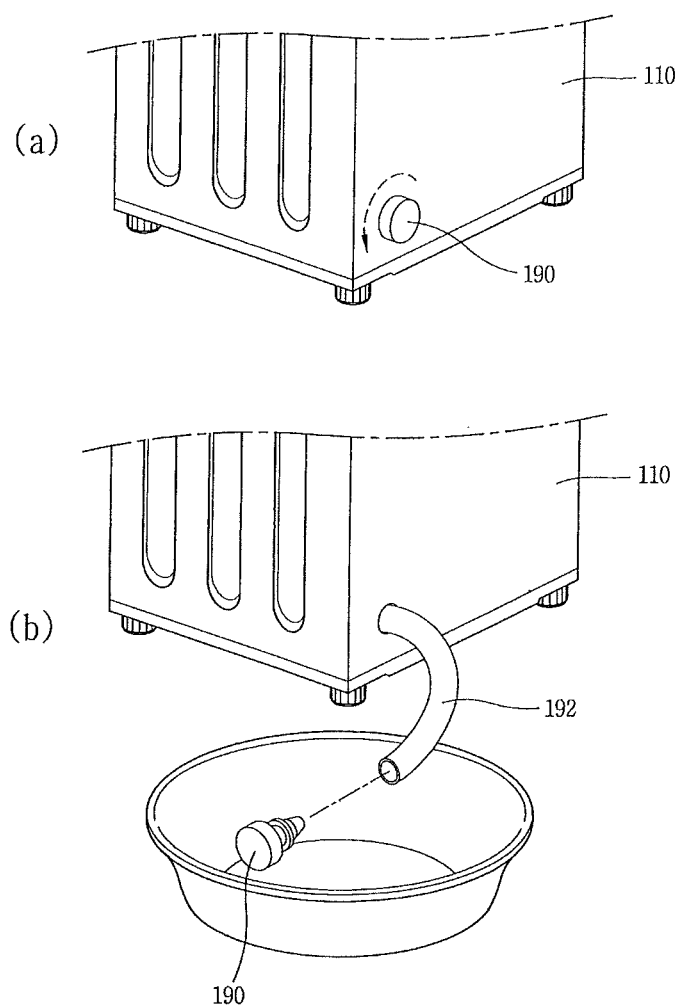
FIG. 6 is a perspective view showing the rear side of the washing machine miniature illustrated in FIG. 1.

Meanwhile, in order to supply water to the interior of the tub 120, the door 110 may be opened and water may be directly supplied to the interior of the drum 150. When water is intended to be discharged, a drain pipe 192 connected with the interior of the tub 120 may be used. With reference to FIG. 6, one end of the drain pipe 192 communicates with the interior of the tub 120, and the other end of the drain pipe 192 is positioned to be adjacent to the rear surface of the casing 102. here, a stopper 190 is installed on the other end of the drain pipe 192, and the stopper 190 is mounted at an outer portion of the rear surface of the casing 102. Thus, with in a state in which the stopper 190 is fixed to the casing 102, the washing machine miniature 100 is operated, and when water is intended to be discharged, the stopper 190 may be separated and the drain pipe 192 fixed to the stopper 190 may be drawn out to discharge water therethrough.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A miniature of a washing machine for exhibition, the miniature comprising:
    a casing having an opening at an upper portion thereof;
    a door configured to open and close the opening of the casing, the door comprising a transparent panel unit that allows for visual inspection of an interior of the casing based on the door being closed;
    a tub fixedly installed within the casing;
    a drum rotatably installed within the tub;
    a driving motor installed at an outer side of the tub;
    an electric motor unit configured to transfer rotary force of the driving motor to the drum;
    a first tub cover installed at an upper portion of the tub, the first tub cover including a guide unit configured to guide water that has, based on the drum being rotated, discharged upwardly along an inner wall surface of the tub toward an inner side of the tub;
    a light emitting unit configured to irradiate light to an interior of the tub, the light emitting unit being positioned at an upper side of the first tub cover; and
    a second tub cover provided at an upper side of the light emitting unit to cover the light emitting unit and the first tub cover,
    wherein the first tub cover is transparent to thereby allow the light from the light emitting unit to pass therethrough and illuminate the interior of the drum, and
    wherein the second tub cover is opaque to thereby prevent the light from the light emitting unit from passing therethrough and directly illuminate an outside of the casing.

2. The miniature of claim 1, wherein the first tub cover has an annular shape having a section in a semi-circular shape.

3. The miniature of claim 2, wherein a plurality of guide vanes having a spiral form are disposed at an inner side of the first tub cover.

4. The miniature of claim 1, wherein a limit switch for detecting whether or not the door is open or closed is installed at an upper portion of the casing, and the limit switch is configured to stop the rotation of the drum when the door is open.

5. The miniature of claim 1, wherein a tilt sensor is installed to be protruded from a lower surface of the casing, and based on the casing being inclined at more than a certain angle or separated by more than a certain distance from the ground, the tilt sensor is configured to become further protruded to stop the rotation of the drum.

6. The miniature of claim 1, wherein the electric motor unit comprises:
   a follower pulley fixed at a lower side of the drum;
   a driving pulley fixed to a rotational shaft of the driving motor; and
   a belt fastened between the follower pulley and the driving pulley.

7. The miniature of claim 1, further comprising a top cover that is provided at an upper portion of the casing, wherein the second tub cover fills a gap between the upper portion of the tub and the top cover to prevent water introduced into the interior of the tub from flowing out of the tub and into the interior of the casing.

8. The miniature of claim 1, further comprising a plurality of legs provided at a lower portion of the tub so that the tub is supported by a bottom surface of the casing.

9. The miniature of claim 1, wherein the light emitting unit comprises a plurality of light emitting diodes disposed on the upper side of the first tub cover along a circumferential direction of the tub cover.

10. The miniature of claim 1, wherein the first tub cover is made of a transparent material so that light irradiated from the light emitting device is diffused along the tub cover to thereby evenly illuminate the interior of the drum.

11. A miniature of a washing machine for exhibition, the miniature comprising:
    a casing having an opening at an upper portion thereof;
    a door configured to open and close the opening of the casing, the door comprising a transparent panel unit that allows for visual inspection of an interior of the casing based on the door being closed;
    a tub fixedly installed within the casing;
    a drum rotatably installed within the tub;
    a plurality of legs provided at a lower portion of the tub so that the tub is supported by a bottom surface of the casing;
    a driving motor installed at an outer side of the tub;
    an electric motor unit configured to transfer rotary force of the driving motor to the drum;
    a first tub cover installed at an upper portion of the tub, the first tub cover including a guide unit configured to guide water that has, based on the drum being rotated, discharged upwardly along an inner wall surface of the tub toward an inner side of the tub;
    a light emitting unit configured to irradiate light to an interior of the tub, the light emitting unit being positioned at an upper side of the first tub cover and comprising a plurality of light emitting diodes disposed on the upper side of the first tub cover along a circumferential direction of the tub cover; and
    a second tub cover provided at an upper side of the light emitting unit to cover the light emitting unit and the first tub cover,
    wherein the first tub cover is transparent to thereby allow the light from the light emitting unit to pass therethrough and illuminate the interior of the drum, the first tub cover being made of a transparent material so that light irradiated from the light emitting device is diffused along the tub cover to thereby evenly illuminate the interior of the drum, and
    wherein the second tub cover is opaque to thereby prevent the light from the light emitting unit from passing therethrough and directly illuminate an outside of the casing.

12. The miniature of claim 11, wherein the first tub cover has an annular shape having a section in a semi-circular shape.

13. The miniature of claim 12, wherein a plurality of guide vanes having a spiral form are disposed at an inner side of the first tub cover.

14. The miniature of claim 11, wherein a limit switch for detecting whether or not the door is open or closed is installed at an upper portion of the casing, and the limit switch is configured to stop the rotation of the drum when the door is open.

15. The miniature of claim 11, wherein a tilt sensor is installed to be protruded from a lower surface of the casing, and based on the casing being inclined at more than a certain angle or separated by more than a certain distance from the ground, the tilt sensor is configured to become further protruded to stop the rotation of the drum.

16. The miniature of claim 11, wherein the electric motor unit comprises:
    a follower pulley fixed at a lower side of the drum;
    a driving pulley fixed to a rotational shaft of the driving motor; and
    a belt fastened between the follower pulley and the driving pulley.

17. The miniature of claim 11, further comprising a top cover that is provided at an upper portion of the casing, wherein the second tub cover fills a gap between the upper portion of the tub and the top cover to prevent water introduced into the interior of the tub from flowing out of the tub and into the interior of the casing.

* * * * *